T. R. McKNIGHT.
DUMP CAR.
APPLICATION FILED MAR. 6, 1916.

1,259,760.

Patented Mar. 19, 1918.
5 SHEETS—SHEET 1.

Witness:
L. B. Graham

Inventor:
Thomas R. McKnight,
By Adams & Jackson.
Att'ys.

T. R. McKNIGHT.
DUMP CAR.
APPLICATION FILED MAR. 6, 1916.

1,259,760.

Patented Mar. 19, 1918.
5 SHEETS—SHEET 3.

Witness:
L. B. Graham

Inventor:
Thomas R. McKnight
By Adams & Jackson
Attys.

UNITED STATES PATENT OFFICE.

THOMAS R. McKNIGHT, OF AURORA, ILLINOIS, ASSIGNOR TO WESTERN WHEELED SCRAPER COMPANY, OF AURORA, ILLINOIS, A CORPORATION OF ILLINOIS.

DUMP-CAR.

1,259,760.  Specification of Letters Patent.  Patented Mar. 19, 1918.

Application filed March 6, 1916. Serial No. 82,391.

*To all whom it may concern:*

Be it known that I, THOMAS R. MCKNIGHT, a citizen of the United States, and a resident of Aurora, in the county of Kane and State of Illinois, have invented certain new and useful Improvements in Dump-Cars, of which the following is a specification, reference being had to the accompanying drawings.

My invention relates to dump cars of that type in which a car body or bed is arranged to be tilted at either side of the track on which the car runs to discharge its load, and to be restored to its normal or carrying position, the operation in each case being performed by fluid-pressure-operated mechanism controlled usually by the engineer of a train of similarly operated cars.

As is well understood by those familiar with this art, it is necessary that means be provided which will lock the car bed in its carrying or horizontal position, to keep it from tilting toward one side or the other of the track, and such locking mechanism must be capable of readily releasing the side of the car bed to be elevated in dumping to permit of the tilting thereof to discharge its load. Heretofore mechanically-operated as well as hand-operated locking devices have been employed for this purpose, and my present invention, in part, has to do with improved mechanism for locking or unlocking the car bed, as may be necessary while it is in use.

In cars of this type it is also customary to provide the car bed with side gates which are held up when necessary to expose the side of the car and permit dumping of its load;—that is to say, the gate at the dumping side is held up while that side of the bed is lowered in dumping, and consequently free discharge of the contents of the bed is permitted. The side gate at the opposite side of the bed is, of course, lifted with that side as the bed is tilted. Another feature of my present invention resides in improved mechanism for controlling the position of the side gates, and includes, among other things, an arrangement by which either side gate may be held up out of its normal position by an undischarged mass of earth or by a boulder, when the car bed is restored to its operative position, without interfering with the locking of the bed in such position. The construction by which this may be accomplished is not claimed broadly herein, as it is included in Letters Patent No. 1,168,420, granted January 18, 1916, to Jay B. Rhodes, but my present invention comprises an improved construction by which this object may be accomplished. In addition to the features above pointed out, my invention includes various other improvements having to do with the locking and unlocking of the car bed, its movement from normal to dumping position, and its restoration from the latter position to its normal or carrying position,—all of which improvements are hereinafter fully described and particularly pointed out in the claims.

In the accompanying drawings,—

It will be understood that in the car illustrated the operating devices provided at the two sides of the car are alike, as the car is intended to dump at either side. The description of the devices at one side, therefore, will suffice for both. It will be apparent, further, that my improvements may also be applied to a car intended to dump at one side only, in which case only such devices would be used as are necessary to effect the desired operations.

Referring to the drawings for a description of the embodiment of my invention therein illustrated,—

Figure 1:
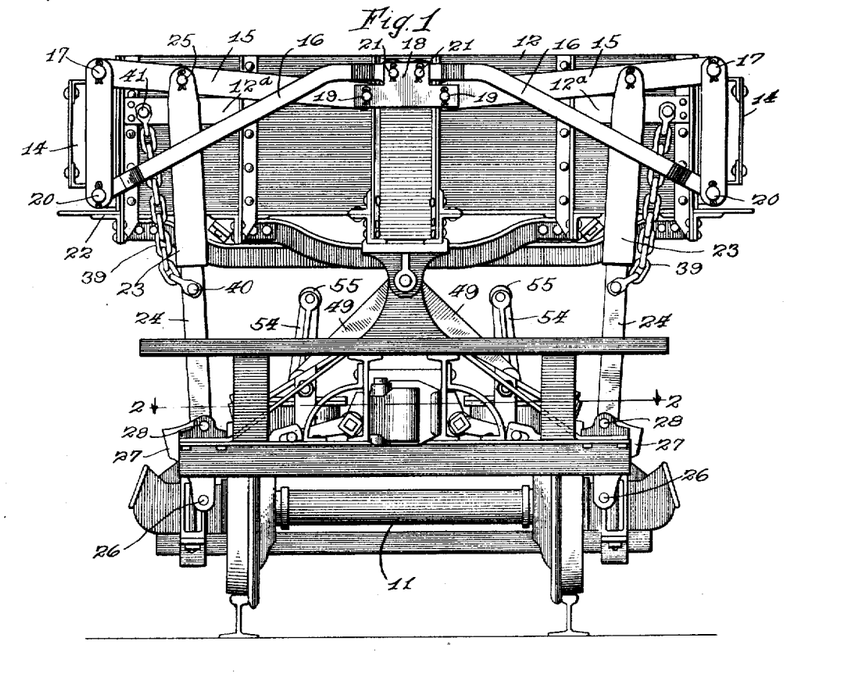
Figure 1 is an end view of my improved car, showing the car bed in its normal position.
Figures 8, 9, 10:
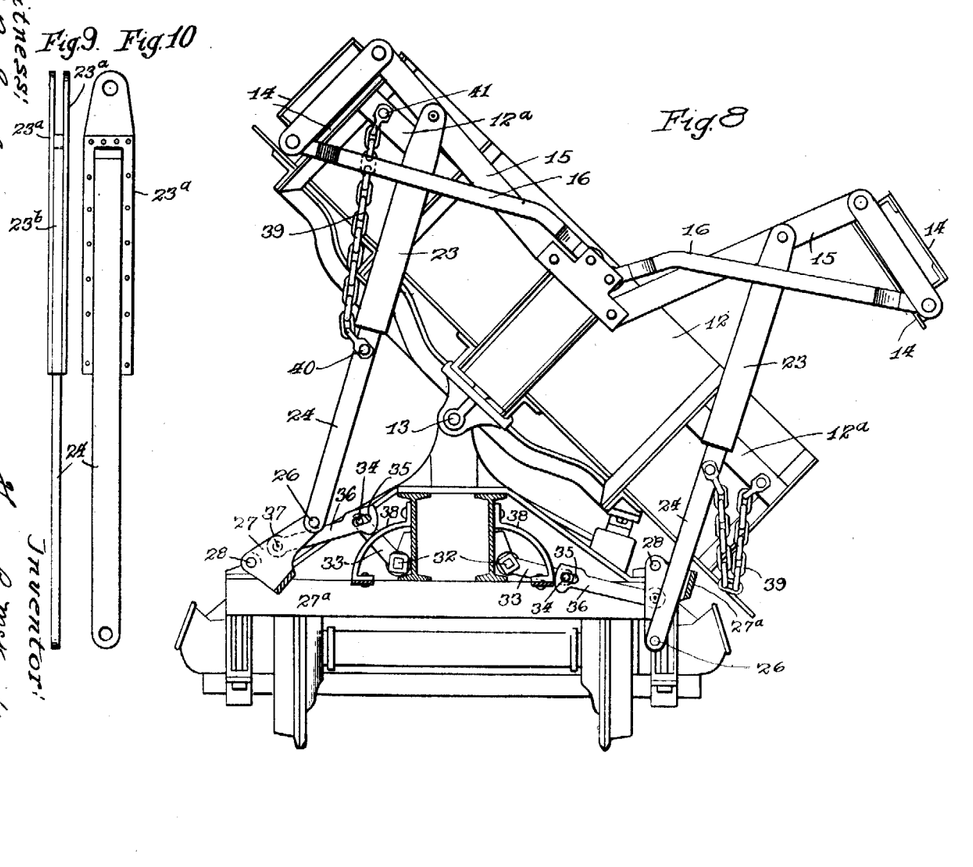
Fig. 8 is a partial end view, some parts being in section.
Fig. 9 is an edge view of one of the extensible bars by which the car bed is locked in operative position and by which also the side gates are manipulated.
Fig. 10 is a side view of one of said bars, one of the side plates of the upper member thereof being removed.

11 indicates the underbody or truck portion of the car, which, except as otherwise stated, may be of any approved construction. 12 indicates the car bed or body, which is of the usual type, and is mounted upon a series of pivots 13 disposed at suitable intervals longitudinally of the car, to permit the car bed to be tilted toward one side or the other of the track. 14 indicates the side gates, which extend longitudinally of the bed and are pivotally connected therewith by swinging supports in the form of pairs of straps 15—16, the straps 15 being pivoted to the upper marginal portions of the side gates, as shown at 17, and to the ends of the bed, preferably by plates 18 and pivots 19. The straps 16 are pivoted to the lower marginal portions of the side gates by pivots 20 and to the plates 18 by pivots 21. By this construction said gates are free to swing vertically and laterally, as illustrated in Fig. 8, the tilting of the bed operating to throw the lower margin of the side gate at the dumping side outward so as to provide a larger outlet for the discharge of the load. When the bed is in its normal position, the gates occupy a vertical position at the sides of the bed, their lower margins resting upon plates 22, as shown in Fig. 1, unless, as sometimes happens, they are held up out of their normal position by a mass of earth or by a boulder which was not discharged when the car bed was tilted. When this happens, the gate may remain up out of its normal position, since, as hereinafter described, my improved construction leaves the gates free to be lifted independently of the car bed.

Figure 2:
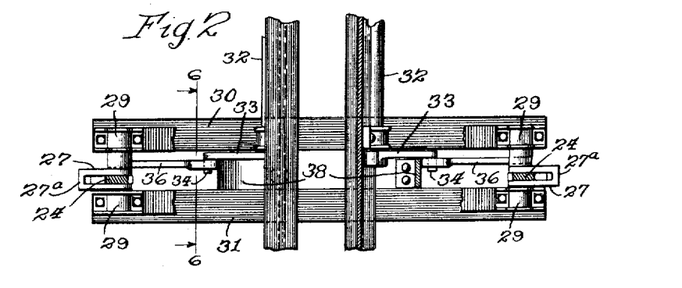
Fig. 2 is a view partly in horizontal section on line 2—2 of Fig. 1, the left-hand center sill I-beam and some parts adjacent thereto being shown in plan.
Figure 3:
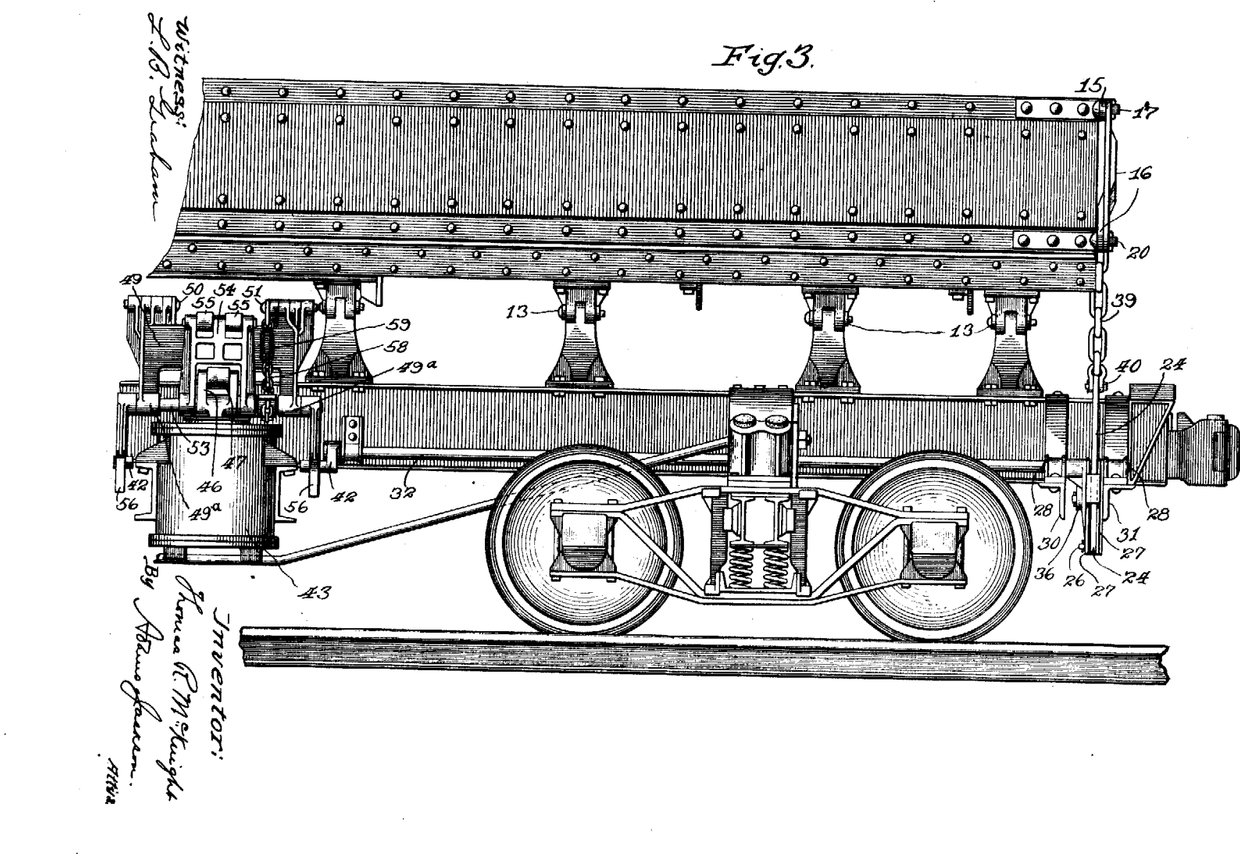
Fig. 3 is a side elevation of slightly more than one-half of the car.

The gate at the dumping side is held up when the bed is dumped by means of locking bars composed of upper and lower members 23—24, which together form an extensible locking bar. In the construction shown, each of these extensible bars comprises an upper tubular or sleeve-like member 23 and a lower member 24 in the form of a bar which is adapted to fit telescopically in the member 23. I prefer to make the tubular members 23 by securing together two plates 23ª at opposite sides of a spacing member 23ᵇ, as shown in Figs. 9 and 10, but any other construction suitable for the purpose may be employed. The upper member 23 is pivotally connected with the gate-supporting members, preferably to the strap 15, by a pivot 25, as shown in Fig. 1; and the lower member 24 is pivotally connected, by a pivot 26, with a laterally-swinging locking device in the form of a stirrup 27 carried by a pivot 28 at the side of the car, as shown in Figs. 1 and 8. The construction of the stirrups 27 is best shown in Figs. 2 and 8, from which it will be seen that said stirrups are U-shaped members open at their inner sides and inclosed at their outer sides. The pivots are in the form of trunnions mounted in bearings in bearing-blocks 29 carried by cross-bars 30—31, as shown in Fig. 2. Thus the members 24 may be swung inward transversely of the car, but cannot swing outward beyond the position shown at the right in Fig. 8. It will be apparent that as long as the member 24 occupies such position that the pivot 26 is below and in line with the pivot 28, the member 24 is locked against endwise movement; and the same is true if the bar is between the pivot 28 and the closed side 27ᵃ of the stirrup 27. If, however, the stirrup 27 is swung to carry the pivot 26 inward and move the member 24 out of line with the pivot 28, the member 24 may then move upward into the position shown at the left in Fig. 8. The stirrup 27 is swung as required by means of a rock-shaft 32 which extends longitudinally of the car, as shown in Fig. 3, and is mounted in bearings provided at suitable intervals. Four of these rock-shafts are provided, two of them extending from near the longitudinal center of the car to points near one end and at opposite sides thereof, while the other two are similarly arranged at the other end of the car. Each of these rock-shafts at its end adjacent to the end of the car is provided with an arm 33 having a pin 34 which fits in a slot 35 in a link 36 pivotally connected at 37 to the stirrup 27. When any stirrup is in its locking position, as shown, for example, at the right in Fig. 8, the arm 33 and link 36 connected therewith are substantially in line, and at this time the inner end of the link 36 bears against the outer surface of a stationary curved guide 38, which holds the link 36 against inward movement endwise and accordingly locks the stirrup in position. By rocking the shaft 32 to swing its arm 33 upward in the manner shown at the left in Fig. 8, the inner end of the link 36 rides up over the guide 38, swinging the lower end of the stirrup 27 inward and carrying the bar 24 upward, as shown.

It will be apparent that the extensible members 23—24 permit the side gates to be lifted independently of the car bed when the latter is in its normal position, since the members 23 connected with the opposite ends of the side gate may move up upon the members 24, leaving the latter in their locked position. The members 24, however, hold up the side gate at the dumping side of the car, since normally the upper ends of the members 24 are at or near the upper ends of the sockets in the members 23, as shown in Fig. 10. In order to lock the car bed in its normal position, the members 24 are connected with the ends of the car bed by chains or other flexible members 39, which, as illustrated in Figs. 1 and 8, are connected at 40 to the bars 24 and at 41 to the ends of the bed. The flexible members 39 thus connect the car bed with the locking devices 27 through the members 24. The object of using flexible members is to permit the bed to be dumped, since when it is tilted at either side, the chain 39 at the dumping side is flexed, as shown at the right in Fig. 8, while that at the high side remains substantially taut, as shown at the left in Fig. 8. The latter condition is made possible by the endwise movement of the member 24, which is then unlocked by the swinging of the stirrup 27 to the position shown at the left in said figure.

Figure 7:
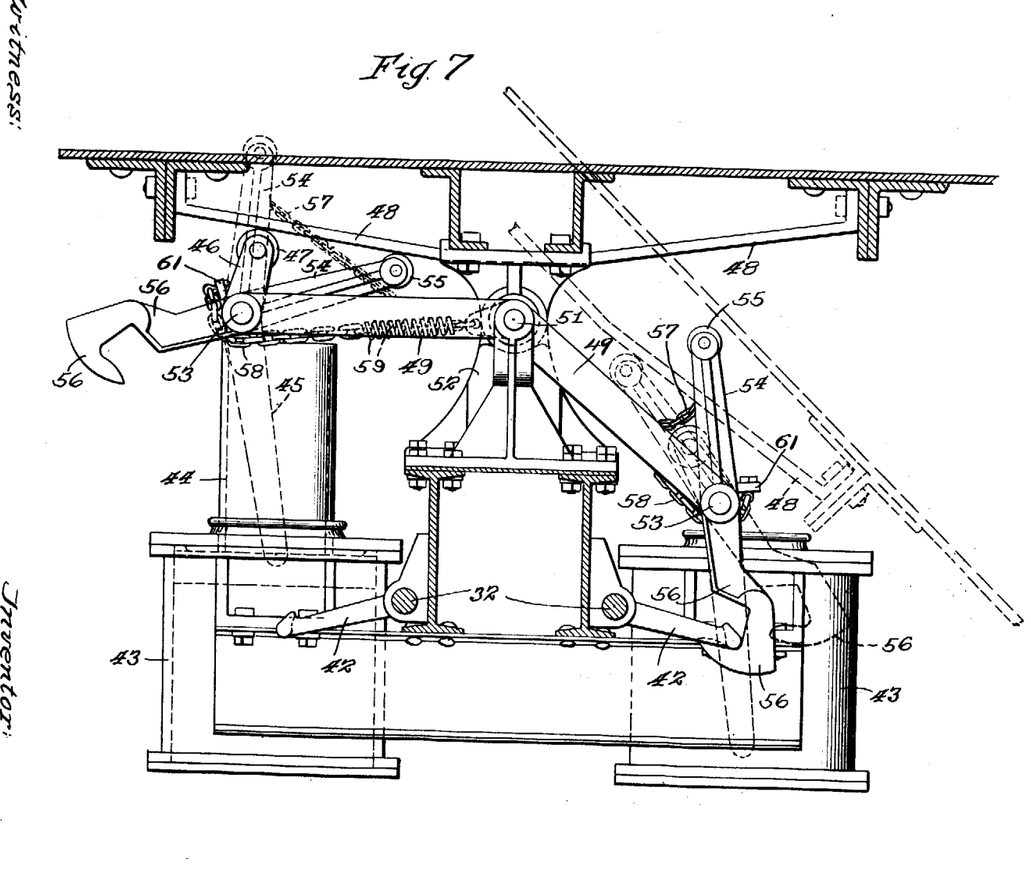
Fig. 7 is an enlarged detail, being a somewhat diagrammatic view taken on line 7—7 of Fig. 4, illustrating the arrangement of the fluid-pressure cylinders with reference to the car bed and the various operating parts associated with and actuated by the hollow pistons. In said figure the normal position of the pistons and the parts operated thereby is shown in full lines at the right, while in full lines at the left is shown the position of the parts at the completion of the movement which restores the bed to its normal position after having been dumped to the left. In dotted lines is shown the position of the parts when the car bed has just been dumped to the right.

The rock-shafts 32 are provided at their inner ends with arms 42, as best shown in Figs. 3 and 7, said arms projecting outwardly transversely of the car. These arms serve as means by which the shafts 32 are rocked, as will be hereinafter described.

Figures 4, 5, 6:
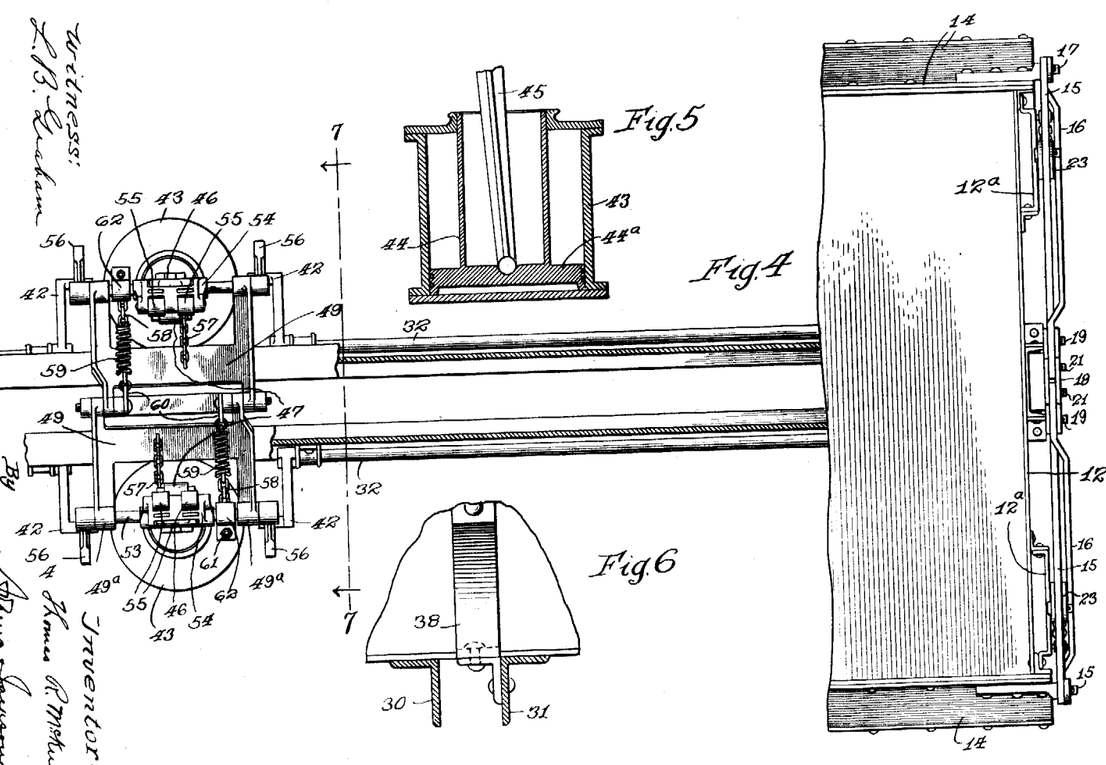
Fig. 4 is a plan view, partly in section, illustrating the position of the fluid-pressure cylinders and the devices operated thereby to dump and to restore the car bed, and showing also in plan the connections at the end of the car by which the side gates are operated and the car bed is locked or unlocked.
Fig. 5 is a vertical section of one of the fluid-pressure-operated pistons with the arm mounted therein.
Fig. 6 is an enlarged detail, being substantially a cross-section on line 6—6 of Fig. 2.

43 indicates the fluid-pressure cylinders by which the several operations are performed. These cylinders are arranged at opposite sides of the car, substantially at the longitudinal center thereof, and each is provided with a tubular piston 44 having a head 44ª at its lower end, as best shown in Fig. 5,—the arrangement being such that by the admission of air or other suitable fluid to the cylinder the piston may be forced upward to the position shown in Fig. 7. Mounted in each of the pistons 44, preferably in the manner shown in Fig. 5, is a rocking arm 45 having a fork 46 at its upper end upon which is mounted an anti-friction roller 47, as best shown in Figs. 3 and 7. When the piston 44 is projected as shown in Fig. 7, this roller 47 is adapted to bear against a transverse plate 48 at the under side of the car bed, or some other suitable surface provided for that purpose. Normally, the roller 47 is out of contact with the plate 48, as shown in Fig. 1, since then the piston 44 is withdrawn into its cylinder. 49 indicates a frame which, generally speaking, is rectangular in shape, its inner marginal portion being pivoted at 50 and 51 to suitable supporting members 52, so arranged that the pivots 50—51 are in the longitudinal axis of the car bed, as shown in Fig. 7. The outer marginal portion of the frame 49 is provided with bearings 49ª through 49 is provided with bearings 49ª through which passes a shaft 53 which fits loosely in said bearing. Said shaft also fits loosely in a bearing in the upper portion of the arm 45 immediately above the upper end of the piston 44 and below the fork 46,—the arrangement being such that said shaft may rock independently of the frame 49 and arm 45. 54 indicates a bifurcated frame, which embraces the fork 46 and is mounted on and keyed to the shaft 53, as best shown in Fig. 3, so that it rocks with said shaft. At its opposite end the frame 54 carries anti-friction rollers 55, as shown. 56 indicates hooks mounted on opposite end portions of the shaft 53 and keyed thereto so as to rock therewith. The hooks 56 are so arranged that when turned to the proper position they are adapted to engage the projecting ends of the arms 42, as shown at the right in Fig. 7. When this occurs, the bifurcated frame 54 occupies a generally upright but slightly inclined position, as also shown at the right in Fig. 7. In order to limit the outward movement of the frame 54 and prevent it from moving outward beyond a position slightly inclined inwardly from the vertical, I provide a chain, or other flexible connection 57, connected with the upper portion of the frame 54 and with the frame 49, as shown in Fig. 4. This permits the upper end of the frame 54 to swing inwardly from an approximately vertical position to an approximately horizontal position, as indicated in Fig. 7. In order to positively move the upper portion of the frame 54 outward and normally hold it in the position shown in Fig. 1, and in dotted lines at the left in Fig. 7, I provide a flexible connection 58 and a spring 59, as best shown in Figs. 3 and 4. The spring 59 is connected at one end with a lug 60 secured in a fixed position, preferably near the axis of the car bed, the other end of the spring being connected to one end of the chain 58. The other end of said chain is connected to a lug 61 carried by a collar 62 non-rotatably secured to the shaft 53, as shown in Fig. 4. The lug 61 projects outward from the shaft 53 and the chain 58 extends under the collar 62, as illustrated in Fig. 7, so that when the shaft 53 is rocked by the swinging inward of the upper end of the frame 54, the chain 58 is taken up, thereby putting the spring 59 under greater tension, as illustrated at the left in Fig. 7. The spring therefore acts to restore the frame 54 to its approximately vertical position as soon as it is released,—the frame being prevented from moving out too far by the chain 57, as already described.

The operation of the car is as follows: When the car is in its normal or horizontal position shown in Fig. 1, the frames 54 are approximately vertical, being slightly inwardly inclined. The rollers 55 carried by said frames are then some distance below the bottom of the bed and the hooks 56 are in engagement with the arms 42. The chains 39 then occupy the position shown in Fig. 1 and hold the bed from tipping in either direction by reason of the fact that the bars 24 are locked by the stirrups 27. The side gates may, however, be lifted independently of the car bed by reason of the extensible arrangement of the members 23—24. Assuming now that the car is to be dumped to the right as illustrated in dotted lines in Fig. 7, air is admitted to the cylinder 43 at the left-hand side of the car, causing its piston 44 to project and carrying its frame 54 into the position shown in dotted lines at the left in Fig. 7. This lifts the left-hand side of the bed, rocking it about its pivots 51. The frame 54 does not tilt inwardly when it is operated to tilt the car body because it is normally held by the spring 59 so that its roller 55 is in its outermost position, and furthermore, when such frame is carried upward by the piston 44 the frame 54 is carried outward from the center of the car so that the roller 55 engages the plate 48 near its outer end, the internal angle formed by these members being an acute one which becomes more acute as that side of the car bed is raised in the tilting operation. The vertical movement of the left-hand piston 44 also swings the frame 49 upward about its pivots 50—51 carrying the hooks 56 upward and through said hooks carrying the arms 42 engaged thereby upward. This rocks the shafts 32 at the left-hand side of the car and swings the stirrups 27 so as to unlock the arms 24 at the left-hand side of the car and at both ends thereof, so that said arms may swing to the position shown in Fig. 8, thereby permitting the bed to tilt in the manner shown in the latter figure. The rock-shafts 32 at the right-hand side of the car are not affected and the parts at that side of the car retain the position shown in full lines at the right in Fig. 7 until the tilting bed strikes the rollers 55 at the upper end of the frame 54 at the right-hand side of the car, causing it to swing inward into the position shown in dotted lines at the right in Fig. 7. This swinging of the frame 54 carries the hooks 56 out of engagement with the arms 42 at the right-hand side of the car, as illustrated in dotted lines in Fig. 7. The side gate at the right-hand side is held up during the dumping operation by the members 23 and 24, as shown in Fig. 8, and the member 24 remains locked, as shown. When the load has been discharged, air is admitted to the right-hand cylinder and is exhausted from the left-hand cylinder, whereupon the right-hand piston is projected and the right-hand side of the bed raised to its horizontal position by the engagement therewith of the roller 47 carried by the fork 46. During the restoring operation the bed cannot pass beyond a horizontal position because the right-hand members 24 at both ends of the car remain locked, and the chains 39 arrest the movement of the bed when it reaches its horizontal position. If during this operation any masses of earth or stone should remain undischarged in a position to underlie the right-hand side gate, such gate may remain up, or partly up, without interfering with the restoration of the bed to its horizontal position. The piston at the left-hand side of the car returns into its cylinder, and as the frame 49 swings downward the hooks 56 carry the arms 42 downward, swinging the stirrups 27 again into locking position by means of the links 36. The links 36, when restored to locking position, prevent the lower ends of the stirrups from swinging inward by reason of their engagement with the guides 38, as shown at the right in Fig. 8.

By using frames 49 and shafts 53 to support the hooks 56 and frames 54, I provide a very strong and efficient construction; and the provision of means for positively restoring the frames 54 and hooks 56 to their normal position, instead of depending upon gravity to accomplish this, is also an important improvement, as it insures the proper engagement of the hooks 56 with the arms 42 and the movement of the frames 54 into proper operative position. The mechanism for locking the bed in its horizontal position is also very effective and constitutes an important part of my invention.

In order to prevent the side gates from being displaced endwise by the jolts or jars to which dump-cars are frequently subjected, the upper members 23 of the locking bars are arranged to bear against plates 12$^a$ secured to the ends of the car, as best shown in Figs. 1, 4 and 8, in such position that at all times the members 23 bear against such plates; and the plates 12$^a$ at the opposite ends of the same side of the car, coöperating with their respective locking bar members 23, consequently support the locking bars against deflection lengthwise of the car and keep the side gates supported by them in proper position notwithstanding any jolts to which the car may be subjected.

It will be understood that while I have described with considerable particularity the embodiment of my invention illustrated in the drawings, my invention is not restricted to the specific construction shown and described, except in so far as it is specifically claimed.

That which I claim as my invention, and desire to secure by Letters Patent, is,—

1. A dump-car, comprising a truck, a car bed adapted to tilt, locking means, a bar connected with said locking means, a flexible member connected with the car bed and with said bar and coacting with said bar and locking means to prevent the car bed from tilting in one direction, and means for releasing said bar to permit the car bed to be tilted.

2. A dump-car, comprising a truck, a car bed adapted to tilt, locking means, a bar connected with said locking means, a flexible member connected with the car bed and with said bar and coacting with said bar and locking means to prevent the car bed from tilting in one direction, and fluid-pressure-operated mechanism for releasing said bar to permit the car bed to be tilted.

3. A dump-car, comprising a truck, a car bed adapted to tilt in opposite directions, locking means, a bar connected with said locking means, a flexible member connected with the car bed and with said bar and coöperating with said bar and locking means to prevent the car bed from tilting in one direction, and means for releasing said bar to permit the car bed to be tilted.

4. A dump car comprising a truck, a car bed adapted to tilt, locking means, a bar connected with said locking means, a flexible member connected with the car bed and with said bar and co-acting with said bar and locking means to prevent the car bed from tilting in one direction, a side gate for the car bed, and means coöperating with said bar to hold up the side gate when the car bed is tilted to discharge its load at that side.

5. A dump car comprising a truck, a car bed adapted to tilt, locking means, a bar connected with said locking means, a flexible member connected with the car bed and with said bar and co-acting with said bar and locking means to prevent the car bed from tilting in one direction, a side gate for the car bed, means coöperating with said bar to hold up the side gate when the car bed is tilted to discharge its load at that side, and mechanism for releasing said bar to permit the car bed to be tilted in the opposite direction.

6. A dump car comprising a truck, a car bed adapted to be tilted in opposite directions, a locking member movable endwise when the car bed is tilted in one direction, means coöperating with said locking member to hold it against endwise movement, means for releasing said locking member to permit the same to move endwise, and means constantly connecting said locking member with the car bed and coöperating with said locking member to prevent tilting of the bed in one direction, meanwhile permitting it to tilt in the opposite direction.

7. A dump car comprising a truck, a car bed adapted to be tilted in opposite directions, a locking member movable endwise when the car bed is tilted in one direction, means coöperating with said locking member to hold it against endwise movement, means for releasing said locking member to permit the same to move endwise, and flexible means constantly connecting said locking member with the car bed and coöperating with said locking member to prevent tilting of the bed in one direction, meanwhile permitting it to tilt in the opposite direction.

8. A dump car comprising a truck, a car bed adapted to be tilted in opposite directions, a locking member movable endwise when the car bed is tilted in one direction, means coöperating with said locking member to hold it against endwise movement, means for releasing said locking member to permit the same to move endwise, means constantly connecting said locking member with the car bed and coöperating with said locking member to prevent tilting of the bed in one direction, meanwhile permitting it to tilt in the opposite direction, a side gate for the car bed, and means connected with the side gate and coöperating with said locking member to hold up the side gate at the adjacent side of the car when the bed is tilted to discharge its load at that side.

9. A dump car comprising a truck, a car bed adapted to be tilted in opposite directions, a locking member movable endwise when the car bed is tilted in one direction, means coöperating with said locking member to hold it against endwise movement, means for releasing said locking member to permit the same to move endwise, flexible means constantly connecting said locking member with the car bed and coöperating with said locking member to prevent tilting of the bed in one direction, meanwhile permitting it to tilt in the opposite direction, a side gate for the car bed, and means connected with the side gate and coöperating with said locking member to hold up the side gate at the adjacent side of the car when the bed is tilted to discharge its load at that side.

10. A dump-car, comprising a truck, a car bed adapted to tilt in opposite directions, a locking member movable endwise when the car bed is tilted in one direction, means for locking said locking member against endwise movement, means for releasing said locking member to permit endwise movement thereof when the car bed is tilted in one direction, a connection between said locking member and the car bed arranged to permit the bed to be tilted in the opposite direction without moving said locking member endwise, side gates for the car bed, and an extensible member coöperating with said locking member to hold up the side gate at the discharge side of the car when the car bed is tilted.

11. A dump-car, comprising a truck, a car bed adapted to tilt in opposite directions, a locking member movable endwise when the car bed is tilted in one direction, means for locking said locking member against endwise movement, means for releasing said locking member to permit endwise movement thereof when the car bed is tilted in one direction, a flexible connection between said locking member and the car bed arranged to permit the bed to be tilted in the opposite direction without moving said locking member endwise, side gates for the car bed, and an extensible member coöperating with said locking member to hold up the side gate at the discharge side of the car when the car bed is tilted.

12. A dump-car, comprising a truck, a car bed adapted to tilt in opposite directions, a locking member movable endwise when the car bed is tilted in one direction, means for locking said locking member against endwise movement, means for releasing said locking member to permit endwise movement thereof when the car bed is tilted in one direction, a connection between said locking member and the car bed arranged to permit the bed to be tilted in the opposite direction without moving said locking member endwise, side gates for the car bed, and a telescopic member coöperating with said locking member to hold up the side gate at the discharge side of the car when the car bed is tilted.

13. A dump-car, comprising a truck, a car bed adapted to tilt in opposite directions, a locking member movable endwise when the car bed is tilted in one direction, means for locking said locking member against endwise movement, means for releasing said locking member to permit endwise movement thereof when the car bed is tilted in one direction, a flexible connection between said locking member and the car bed arranged to permit the bed to be tilted in the opposite direction without moving said locking member endwise, side gates for the car bed, and a telescopic member coöperating with said locking member to hold up the side gate at the discharge side of the car when the car bed is tilted.

14. A dump-car, comprising a truck, a car bed adapted to tilt in opposite directions, an extensible locking bar, a locking-device coöperating with said locking bar to hold it in locking position, means for releasing said locking bar to permit the car bed to be tilted in one direction, a connection between said locking bar and the car bed arranged to permit tilting of the bed in the opposite direction while said locking bar is in locking position, and a side gate for the car bed connected with said extensible locking bar.

15. A dump-car, comprising a truck, a car bed adapted to tilt, a locking-device, a flexible member connected with the car bed and with said locking-device and acting to prevent the car bed from tilting in one direction, means for releasing said flexible member to permit the car bed to be tilted in such direction, a side gate for the car bed, and means for holding up the side gate when the car bed is tilted in the opposite direction to discharge its load.

16. A dump-car, comprising a truck, a car bed adapted to tilt in opposite directions, side gates for the car bed and swinging supports for the side gates, extensible members at the opposite sides of the car and connected with said side gates, locking devices connected with said extensible members and with the truck at opposite sides thereof, said locking devices being adapted to swing to lock or release said extensible members, and connections between the lower portions of said extensible members and the car bed arranged to permit tilting of the bed without unlocking the extensible members at the tilting side of the car.

17. A dump-car, comprising a truck, a car bed adapted to tilt in opposite directions, side gates for the car bed and swinging supports for the side gates, extensible members at the opposite sides of the car and connected with said side gates, locking devices connected with said extensible members and with the truck at opposite sides thereof, said locking devices being adapted to swing to lock or release said extensible members, and flexible connections between the lower portions of said extensible members and the car bed.

18. A dump-car, comprising a truck, a pivotally-mounted car bed, a side gate for the car bed, swinging supporting means for said side gate, and endwise movable extensibly connected members for holding up the side gate, one of said members being connected with the side gate and the other with the truck.

19. A dump-car, comprising a truck, a pivotally-mounted car bed, a side gate for the car bed, swinging supporting means for said side gate, and endwise movable extensibly connected members for holding up the side gate, one of said members being connected with the side gate supporting means and the other with the truck.

20. A dump-car, comprising a truck, a pivotally-mounted car bed, a side gate for the car bed, swinging supporting means for said side gate, and endwise movable means consisting of members telescopically connected together for holding up the side gate.

21. A dump-car, comprising a truck, a pivotally-mounted car bed, a side gate for the car bed, swinging supporting means for said side gate, and endwise movable extensible means for holding up the side gate consisting of upper and lower telescoping members, the upper member being connected with said side gate supporting means.

22. A dump-car, comprising a truck, a car bed adapted to tilt in opposite directions to discharge its load, a fluid-pressure-operated member movable to elevate one side of the car bed to tilt the same in one direction and being arranged to swing inwardly under the car bed out of operative position when the car bed is tilted in the opposite direction, and a spring for restoring said member to operative position.

23. A dump-car, comprising a truck, a car bed adapted to tilt in opposite directions to discharge its load, a fluid-pressure-operated member movable to elevate one side of the car bed to tilt the same in one direction and being arranged to swing inwardly under the car bed out of operative position when the car bed is tilted in the opposite direction, a spring for restoring said member to operative position, and means for limiting the movement of said member under the action of said spring.

24. A dump-car, comprising a truck, a car bed mounted to tilt in opposite directions, locking means for normally holding the car bed in operative position, fluid-pressure-operated means for elevating one side of the car to tilt the same, a rock-shaft adapted to be rocked by said fluid pressure operated means to release such locking means, a member movable into and out of operative relation with said rock-shaft, said member being operated by fluid pressure to rock said shaft to release said locking-means, and a spring for holding said member normally in operative relation to said rock-shaft.

25. A dump-car, comprising a truck, a car bed mounted to tilt in opposite directions, locking means for normally holding the car bed in operative position, fluid-pressure-operated means for elevating one side of the car to tilt the same, a rock-shaft adapted to be rocked by said fluid pressure operated means to release such locking means, a hook movable into and out of operative relation with said rock-shaft, said hook being operated by fluid pressure to rock said shaft to release said locking means, and a spring for holding said hook normally in operative relation to said rock-shaft.

26. In a dump-car, the combination of a truck, a car bed adapted to tilt in opposite directions, a fluid-pressure-operated piston, a swinging support, a hook pivotally mounted upon said support, a rock-shaft adapted to be operatively engaged by said hook whereby when said piston is projected said rock-shaft may be rocked, locking means for normally holding the car bed in its normal position, means operated by said rock-shaft for releasing said locking means, and a spring for normally holding said hook in operative relation to said rock-shaft.

27. In a dump-car, the combination of a truck, a car bed adapted to tilt in opposite directions, a fluid-pressure-operated piston, a swinging support, a hook pivotally mounted upon said support, a rock-shaft adapted to be operatively engaged by said hook whereby when said piston is projected said rock-shaft may be rocked, locking means for normally holding the car bed in its normal position, means operated by said rock-shaft for releasing said locking means, and a spring connected with said hook and put under tension by rotation thereof in one direction, for moving said hook into operative relation to said rock-shaft.

28. In a dump-car, the combination of a truck, a car bed adapted to tilt, a fluid-pressure-operated piston, a swinging support operated by said piston, a member pivotally connected with said swinging support and operated by the projection of said piston to lift one side of the car bed to tilt the same, said member being adapted to be rocked out of operative position, and a spring for normally holding said member in operative position.

29. In a dump-car, the combination of a truck, a car bed adapted to tilt, a fluid-pressure-operated piston, a swinging support operated by said piston, a member pivotally connected with said swinging support and operated by the projection of said piston to lift one side of the car bed to tilt the same, said member being adapted to be rocked out of operative position, and a spring connected with said member and adapted to be put under tension by the rotation thereof in one direction, said spring acting to normally hold said member in operative position.

30. In a dump-car, the combination of a truck, a car bed adapted to tilt, a fluid-pressure-operated piston, a swinging support operated by said piston, a member pivotally connected with said swinging support and operated by the projection of said piston to lift one side of the car bed to tilt the same, said member being adapted to be rocked out of operative position, a spring for normally holding said member in operative position, and means for limiting the movement of said member under the action of said spring.

31. In a dump-car, the combination of a truck, a car bed adapted to tilt, a fluid-pressure-operated piston, a swinging support operated by said piston, a member pivotally connected with said swinging support and operated by the projection of said piston to lift one side of the car bed to tilt the same, said member being adapted to be rocked out of operative position, a spring for normally holding said member in operative position, and a flexible connection for limiting the movement of said member under the action of said spring.

32. In a dump-car, the combination of a truck, a car bed pivotally mounted on the truck and adapted to tilt in either direction, a frame pivoted concentrically with the pivot of the car bed to swing vertically, a fluid-pressure-operated piston for swinging said frame, a shaft mounted in said frame, a member mounted on and keyed to said shaft and adapted to be moved into engagement with the car bed for tilting the same, a hook mounted on and keyed to said shaft, a rock-shaft adapted to be normally operatively engaged by said hook whereby the projection of said piston will operate said rock-shaft, locking means, and means operated by the rocking of said shaft for moving said locking means into or out of operative position.

33. In a dump-car, the combination of a truck, a car bed pivotally mounted on the truck and adapted to tilt in either direction, a frame pivoted concentrically with the pivot of the car bed to swing vertically, a fluid-pressure-operated piston for swinging said frame, a shaft mounted in said frame, a member mounted on and keyed to said shaft and adapted to be moved into engagement with the car bed for tilting the same, a hook mounted on and keyed to said shaft, a rock-shaft adapted to be normally operatively engaged by said hook whereby the projection of said piston will operate said rock-shaft, locking means, means operated by the rocking of said shaft for moving said locking means into or out of operative position, and a spring connected at one end to a fixed support and at the other end to said shaft and operating to restore said hook to its normal position.

34. In a dump-car, the combination of a truck, a car bed pivotally mounted on the truck and adapted to tilt in either direction, a frame pivoted concentrically with the pivot of the car bed to swing vertically, a fluid-pressure-operated piston for swinging said frame, a shaft mounted in said frame, a member mounted on and keyed to said shaft and adapted to be moved into engagement with the car bed for tilting the same, a hook mounted on and keyed to said shaft, a rock-shaft adapted to be normally operatively engaged by said hook whereby the projection of said piston will operate said rock-shaft, locking means, means operated by the rocking of said shaft for moving said locking means into or out of operative position, a spring connected at one end to a fixed support and at the other end to said shaft and operating to restore said hook to its normal position, and means for limiting the movement of said shaft under the action of said spring.

35. In a dump-car, the combination of a truck, a tilting car bed, a stirrup pivotally mounted on the truck, a locking-bar pivotally connected to said stirrup and adapted to be swung inwardly or outwardly by the rocking of said stirrup, a rock-shaft, a link connected with said stirrup, an arm connected with said rock-shaft and with said link, and a stationary curved guide mounted on the truck and coöperating with said link to normally prevent inward movement of said stirrup.

36. A dump-car, comprising a truck, a car bed adapted to tilt, a side gate for the car bed, bars at the ends of the car for holding up the side gate when the bed is tilted to discharge its load at that side, and bearing devices at the ends of the bed between the bed and said bars for holding the side gate against endwise movement.

37. A dump-car, comprising a truck, a car bed adapted to tilt, a side gate for the car, bars at the ends of the car pivotally supported on the truck and arranged to hold up the side gate when the bed is tilted to discharge its load at that side, and bearing plates at the ends of the bed coöperating with said bars to prevent endwise displacement of the side gate.

38. A dump-car, comprising a truck, a car bed adapted to tilt, a side gate for the car, extensible members at the ends of the bed pivotally supported on the truck and arranged to hold up the side gate when the bed is tilted to discharge its load at that side, and bearing plates at the ends of the bed coöperating with said members to prevent endwise displacement of the side gate.

THOMAS R. McKNIGHT.